United States Patent [19]
Cott

[11] 4,242,533
[45] Dec. 30, 1980

[54] TEST STATION APPARATUS

[76] Inventor: Norris E. Cott, 216 Trinity Dr., McMurray, Pa. 15317

[21] Appl. No.: 940,816

[22] Filed: Sep. 11, 1978

Related U.S. Application Data

[63] Continuation-in-part of Ser. No. 788,285, Apr. 18, 1977, abandoned.

[51] Int. Cl.³ .................... H02G 9/02; H02G 3/08; H05K 5/00
[52] U.S. Cl. ........................................ 174/38; 174/60
[58] Field of Search .................. 174/37, 38, 44, 48, 174/59, 60, 75 B, 138 F; 361/426, 427

[56] References Cited

U.S. PATENT DOCUMENTS

| 3,162,718 | 12/1964 | Gunthel, Jr. | 174/38 |
| 3,531,010 | 9/1970 | Handley et al. | 174/37 X |

FOREIGN PATENT DOCUMENTS

| 572465 | 3/1933 | Fed. Rep. of Germany | 174/38 |
| 1640769 | 12/1970 | Fed. Rep. of Germany | 174/38 |
| 1961354 | 2/1972 | Fed. Rep. of Germany | 174/38 |
| 166600 | 3/1959 | Sweden | 174/38 |
| 1022309 | 3/1966 | United Kingdom | 174/48 |

Primary Examiner—Laramie E. Askin
Attorney, Agent, or Firm—Thomas H. Murray; Clifford A. Poff

[57] ABSTRACT

Electrical currents and potentials in test leads associated with underground piping, cables and the like are monitored by a test station apparatus which essentially includes a collar supported by a tubular plastic conduit for subterranean implantation or carried aboveground by a carrier plate. A plastic tube projecting from diametrically-opposed sides of the conduit provides one form of anchor means to maintain the conduit within the ground while in another form the anchor means consists of a collar retained on the lower end of the conduit by a sleeve. Further embodiments include two different forms of carrier plates for aboveground support of the test station. A collet-type compression fitting is used to attach a collar onto the upper end of the conduit. Pedestals extend vertically from the end wall at opposed sides of an annular opening in the collar. The pedestals support a terminal block extending across the annular opening so that test leads pass through the collar for attachment at either side of the terminal block to terminals which are normally enclosed by a dome-shaped cover secured to the collar by threads or by one of different embodiments of interlocking members.

33 Claims, 12 Drawing Figures

U.S. Patent  Dec. 30, 1980  Sheet 1 of 3  4,242,533
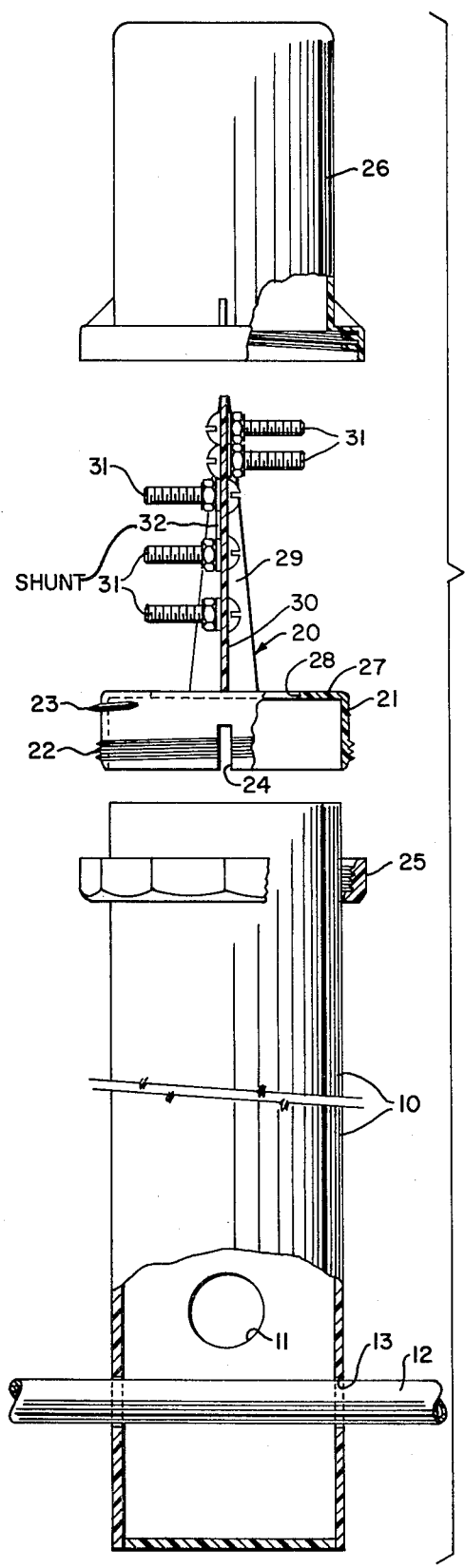
Fig. 1
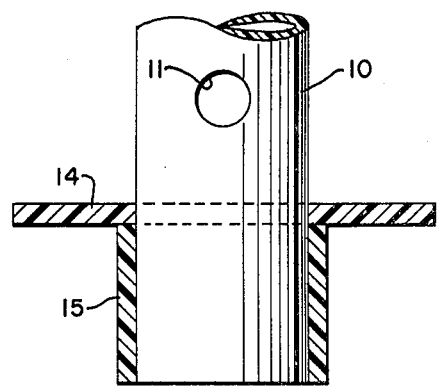
Fig. 2
Fig. 3

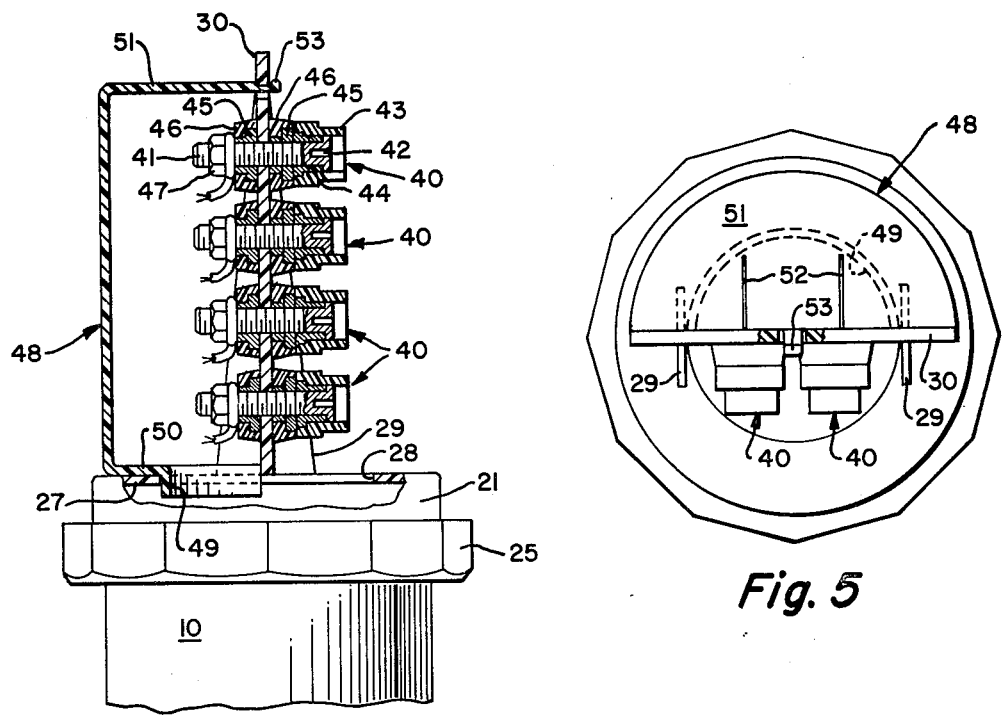
Fig. 4
Fig. 5
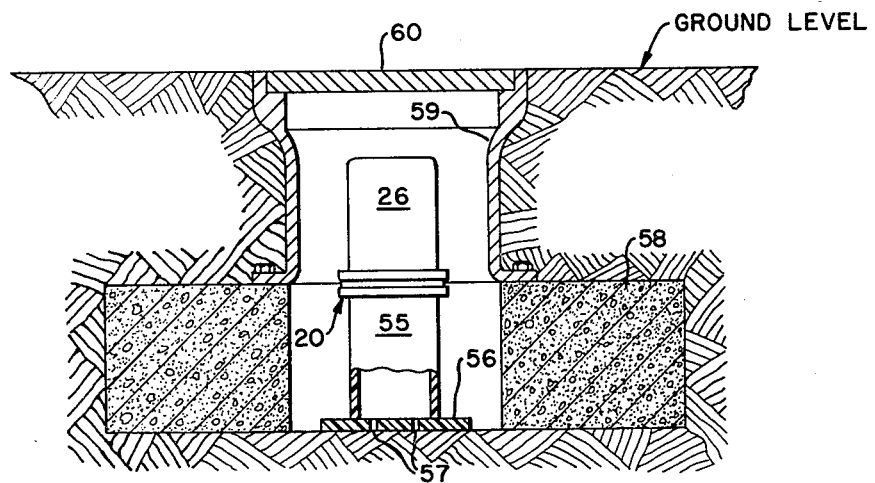
Fig. 6

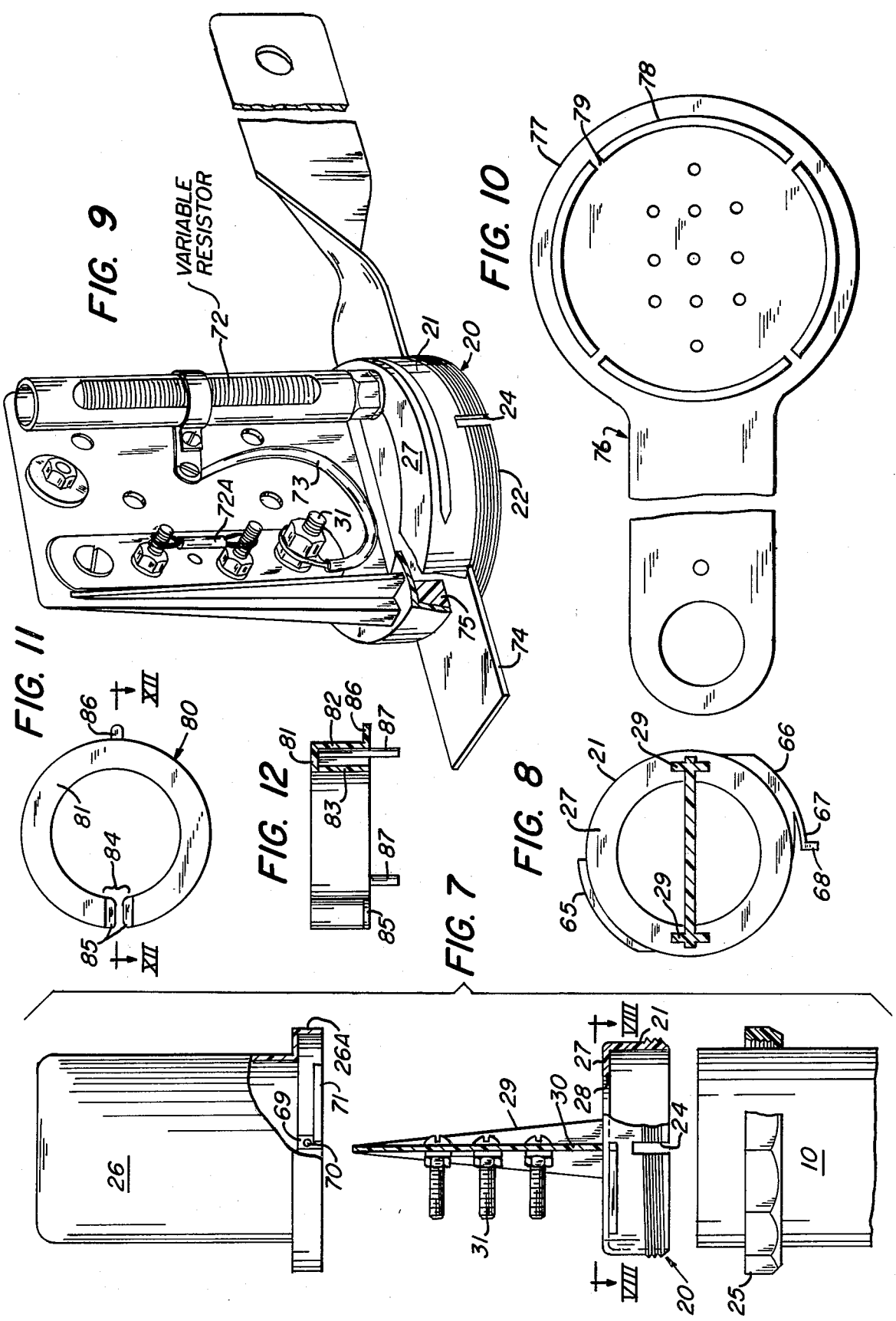

TEST STATION APPARATUS

CROSS-REFERENCE TO RELATED APPLICATION

This application is a continuation-in-part of application Ser. No. 788,285, filed Apr. 18, 1977, now abandoned.

BACKGROUND OF THE INVENTION

This invention relates to an improved construction and arrangement of parts to provide a test station of the type employed to monitor electrical currents and potentials associated with underground piping, cables and the like. More particularly, the present invention relates to such a test station made from plastic material that is non-corrosive and electrically protective for field installation without special tool requirements and to the improvement in the construction of the test station to provide access to test terminals from both sides of a terminal block while the test station is supported by a novel anchor arrangement.

Test stations are typically employed to provide aboveground terminals for convenient monitoring of electrical currents and potentials associated with numerous types of underground piping, cables and other metallic structures. For example, test stations are used as a terminal point for test leads to read underground structure to soil potentials, cathodic protection anode currents, the resistive integrity of insulating flanges and joints as well as the integrity of insulation between various types of underground metallic structures including a pipe, its casing or carrier. Such test stations are also used for detecting and measuring stray electrical currents in underground or subterranean structures as well as for reading electrical potential.

In the past, a test station was made from a conduit and fittings consisting of aluminum material. Not only does the aluminum material undergo destructive corrosion but also it offered no protection to personnel against electrical shocks. The test terminals were usually housed in a heavy cast aluminum structure that had a removable cover plate for access to only one side of the terminals without physically detaching the entire terminal block from the stationary cast aluminum enclosure. Moreover, this portion of the enclosure included a threaded flange to receive the threaded end of a conduit pipe. After installation of a test station was completed, it was a difficult and cumbersome operation to remove the cast aluminum enclosure from the conduit pipe since the threaded interconnection was usually corroded and the lead wires had to be removed from the test terminals to accommodate the required rotation to disconnect the threaded interconnection.

SUMMARY OF THE INVENTION

It is an object of the present invention to provide a test station having an improved construction and arrangement of parts to facilitate not only subterranean or aboveground installation but also the intended monitoring operations while greatly reducing the danger of electrical shock hazards to personnel.

It is a further object of the present invention to provide a test station apparatus embodying an improved anchor system to maintain the apparatus within its intended subterranean implantation and inhibit inadvertent removal.

It is a further object of the present invention to provide a test station apparatus wherein test terminals are carried by a unitary terminal support structure that is readily secured to and removed from a conduit pipe or support member without necessitating the removal of test leads from the terminals and at the same time providing complete access to the test terminals without the need for disassembling parts of the test station.

According to the present invention, there is provided a test station apparatus to monitor electric currents and potentials in test leads coupled with piping, cables and the like, the apparatus including the combination of a collar including a side wall having threads on the surface thereof and slotted openings at spaced peripheral locations, the collar including an end wall having an annular opening to pass the test leads through the collar, a nut member having a threaded surface for mating engagement with the threads on the collar, a support member engaging the collar for attachment thereto by the nut member, pedestals extending vertically from the end wall of the collar at opposite sides of the annular opening therein, a terminal block supported by the pedestals to traverse across the annular opening in the end wall of the collar such that opposed face surfaces of the terminal block overlie semicircular segments of the annular opening, terminals carried by the terminal block for coupling to the test leads extending through either semicircular segment of the annular opening, and cover means normally supported by the collar to enclose the terminals.

In the preferred form, the aforesaid collar, pedestals and terminal block are defined by a unitary plastic member which is coupled to the upper end of the conduit by a collet-type compression fitting or the unitary plastic member is supported by a carrier plate. A semicircular cover includes a projection to releasably engage the terminal block for retaining the cover in an enclosing relation with the ends of the terminals at one side of the terminal block. When a conduit is used, anchor means in one form consists of a plastic pipe extending through diametrically-opposed openings in the lower end of the conduit while in a different form the anchor means includes a collar-like plate member with an annular opening to receive the lower end of the tubular conduit and retained on the lower end thereof by a sleeve secured thereto. A sleeve member with a divided side wall is, when desired, compressively interfitted between the conduit and the collar.

According to a further aspect of the present invention, there is provided a test station apparatus including the combination of a collar having a side wall with an opening for external support, the collar including an end wall having an annular opening to pass test leads outwardly through the collar, pedestals extending vertically from the end wall of the collar at opposite sides of the annular opening therein, a terminal block supported by the pedestals to traverse across the annular opening in the end wall of the collar such that opposed face surfaces of the terminal block overlie semicircular segments of the annular opening, terminals carried by the terminal block for coupling to the test leads extending through either semicircular segment of the annular opening, a carrier plate extending through the opening in the side wall to support the collar and terminal block aboveground, and cover means normally supported by the collar to enclose the terminals.

These features and advantages of the present invention as well as others will be more fully understood when the following description is read in light of the accompanying drawings, in which:

FIG. 1 is an exploded elevational view of a test station apparatus according to one embodiment of the present invention;

FIG. 2 is a partial view illustrating a modified form of an anchor for the test station apparatus shown in FIG. 1;

FIG. 3 is an exploded elevational view illustrating a modification to the apparatus shown in FIG. 1;

FIG. 4 is an elevational view illustrating a further embodiment of a test station apparatus;

FIG. 5 is a plan view of the apparatus shown in FIG. 4;

FIG. 6 is an elevational view, partly in section, of a modified support for a test station apparatus;

FIG. 7 is a view similar to FIG. 3 but illustrating a further embodiment of a cover locking device;

FIG. 8 is a sectional view taken along line VIII—VIII of FIG. 7;

FIG. 9 is an isometric view of a test station apparatus with one form of aboveground support;

FIG. 10 is a plan view of a second embodiment of aboveground support;

FIG. 11 is a plan view of a sleeve member for use between a conduit and a test station; and FIG. 12 is a sectional view taken along line XII—XII of FIG. 11.

In FIG. 1, there is illustrated a conduit 10 in the form of a plastic pipe preferably made from polyethylene for subterranean implantation in close proximity to underground piping, cables and other metallic structures. The conduit includes an annular opening 11 at diametrically-opposed sides for receiving and passing test leads into the interior of the conduit 10 and protecting them for passage along the length of the conduit to a point aboveground.

According to one important feature of the present invention, an anchor means is provided to inhibit unintentional withdrawal of the conduit 10 from the subterranean implantation. In one form, the anchor means is a desired length of rod or tubing 12 preferably made from polyethylene. The diameter of the tubing 12 is substantially smaller than the diameter of the conduit so that the tubing may extend through aligned openings 13 at diametrically-opposed locations at the lower end of the conduit and project outwardly therefrom at each side of the conduit by a distance of approximately of at least 2½ or 3 inches. FIG. 2 illustrates a modified form of an anchor wherein a collar 14 made from a flat plate of polyethylene or similar material has an annular opening corresponding essentially to the outside diameter of the conduit 10. The collar is passed onto the end of the conduit after which a sleeve 15 is adhered by glue or other suitable means to the end of the tubing and forms a retainer for the collar.

Referring again to FIG. 1, the aboveground apparatus forming part of the test station essentially includes a unitary test station device that is preferably constructed from plastic material and specifically by molding polycarbonate resin material. This material is presently available from the General Electric Corporation, sold under the trademark LEXAN, and Mobay Chemical Company, sold under the trademark MERLON. These polycarbonate materials typically have a dielectric strength of 380 volts per mil. They are stable under ultraviolet attack and dimensionally stable within the temperature range of −100° F. to +250° F. The material is lightweight, approximately one-half that of aluminum, and exhibits a strength-to-weight ratio equal to aluminum while providing an impact strength of four times greater than provided by aluminum. The unitary test station apparatus 20 includes a collar 21 having an annular side wall that defines on its outer surface a first series of threads 22 and a second series of threads 23. The first series of threads 22 is located on the lower terminal edge of the collar and these threads are rendered discontinuous about the peripheral surface of the collar by spaced-apart slotted openings 24. The lower portion of the collar consisting of the threaded portion 22 and openings 24 defines a collet chuck which is compressively secured onto the upper end of the conduit 10 by a collet nut 25. A second series of threads 23 on the outer surface of the collar is employed for mating engagement with internal threads formed in a cover 26 which is a dome-like structure normally enclosing the terminal members of the test station to be hereinafter described. The collar 21 further includes an end wall 27 defining a centrally-arranged annular opening 28. Pedestals 29 project vertically from the wall 27 at diametrically-opposed sides of the collar. These pedestals are an integral part of the collar and integral with a terminal block 30 which extends between the pedestals to traverse across the annular opening 28 such that the opposed face surfaces of the terminal block overlie semicircular segments of the annular opening. This arrangement of parts enables free and unimpeded access to both sides of the terminal block whereby test leads in the conduit 10 may pass along either or both sides of the terminal block for coupling to terminals 31. As illustrated in FIG. 1, the terminals are in the form of screw and nut assemblies that are arranged to extend from either side of the terminal block. As is the usual practice, shunts may be connected across various terminals as necessary or desirable. A shunt 32 is shown in FIG. 1 and may be removed or installed without disassembling the parts forming the test station.

The test station apparatus of the present invention is placed into operation by first implanting the conduit 10 to a desired extended depth within an excavated area adjacent a metallic pipeline or the like. The test leads are passed through openings 11 and drawn vertically along the extended length of the conduit. The earth is then back-filled and a test station apparatus 20 is attached to the exposed upper end of the conduit by the collet-type compression fitting. By coupling the test station device 20 to the conduit in this manner, the test station device may be replaced without unearthing the entire conduit assembly. Moreover, different diameter conduits may be used with a single design of a test station device by employing adapter collars. Such adapter collars, while not shown in the drawing, consist of a collar having an inner diameter conforming to the diameter of the conduit 10 and an outside diameter conforming to the internal diameter of the collar 21. The test leads are then drawn through either semicircular opening beneath the terminals for coupling to the terminals 31. After this assembly procedure is completed, the dome-shaped cover is placed on the collar and held in place by the threaded interconnection.

FIG. 3 illustrates a modified form of an interlock to releasably fasten the cover 26 onto the collar 21 for enclosing terminals 31. Diametrically-opposed surfaces of the collar 21 each includes an outwardly projecting wall 35. The wall extends about a course defining boundries to interconnected areas wherein a lock bar 36 on the cover 26 is releasably retained. When the cover is lowered into an enclosing relation with pedestals 29, the lock bar 36 is first received within an entry recess 37. The cover is then rotated to the left as one views FIG. 3, to move the locking bar into a holding recess 38 wherein the bar is moved downwardly toward nut 25 against the lower portion of wall 35. The cover is then rotated to the right as one views FIG. 3 whereby the locking bar moves into a locking recess 39. This tortuous path of travel by the locking bar deters unauthorized and unintentional removal of cover 26 from the test station apparatus 20.

FIGS. 4 and 5 illustrate a modified form of terminals and protective cover for one side thereof. The terminal block 30, pedestals 29 and collar 21 are the same as previously described. An array of openings in the terminal block support terminal assemblies 40. Each terminal assembly includes a threaded shaft 41 having a socket opening 42 in one end to receive a lead of a test meter. A plastic sleeve 43 forms an insulative covering on a metal nut 44 which engages the threaded shaft 41. Metal washers 45 carrying plastic sleeves 46 are located at opposite sides of the terminal block 30 on shaft 41. A nut 47 secures the bare end of a test lead on the free end of shaft 41 and secures the terminal assembly to the terminal block. It is preferred to arrange the terminal assemblies so that all the test leads are located at a common side of the terminal block. A plastic protective cover 48 is semicircular and includes a semicircular lip 49 extending downward from the bottom wall 50. The lip 49 extends into a segment of the annular opening 28 at one side of the terminal block 30. The bottom wall 50 is supported upon the wall 27 of the collar 21. An upper wall 51 of the cover 48 includes parallel slots 52 with a projection 53. The projection has a notched end for locking engagement in an opening in the terminal block 30. The area of the top wall between slots 52 is elastically deformable to unlock the projection 53 from the block 30 for removal of cover 48.

FIG. 6 illustrates a further embodiment of a support for the test station of the present invention. A test station 20 including cover 26 is connected by a short length of a plastic pipe conduit 55 to a rectangular base 56. The base is made from plastic material such as molded polycarbonate resin and includes a plurality of openings 57 arranged to pass test leads into the conduit 55. The base is used for free-standing support of the test station within an opening provided in a concrete block 58 located below ground level. A pipe 59 with a removable cover 60 extends from the concrete block to ground level to protectively house the free-standing test station.

FIGS. 7 and 8 illustrate a further embodiment of the present invention addressed to a further modified form of an interlock to releasably fasten cover 26 onto the collar 21 for enclosing terminals 31. Projecting outwardly from collar 21 are diametrically-opposed lock bars 65 and 66. Lock bar 66 includes a resilient arm 67 having at its projected end a stop member 68. The stop member 68 projects outwardly from the collar for passage into a recess 69 at the inside surface of an enlarged end 26A at the bottom of cover 26. A small diameter hole 70 extends from the recess 69 through the wall of the cover 26 so that a rod-shaped instrument can be inserted through hole 70 into contact with the stop member 68 when received within recess 69. The cover further includes lock bars 71 at diametrically-opposed locations arranged so that one lock bar 71 extends across and terminates at recess 69. Lock bars 71 form with the lock bars 65 and 66 a bayonet-type connection. The arrangement of parts is such that when the cover is positioned onto the collar 21, the lock bars pass along the side wall at the enlarged end thereof between the lock bars 65 and 66. After the enlarged end 26A is seated against the end wall 27 of the collar, the cover is rotated so that lock bars 71 pass beneath lock bars 65 and 66. Continued rotation of the cover 26 moves the recess 69 into alignment with the stop member 68, the latter passing into the recess under the resilient force developed by arm 67. When this occurs, the cover can no longer be rotated relative to the sleeve to deter unauthorized access to the terminals. However, by displacing the stop member 68 from recess 69 through the use of a rod-shaped instrument passed through hole 70, rotation of the cover is possible since it is no longer locked to the collar.

FIG. 9 illustrates a further embodiment of the present invention which is addressed to one form of aboveground support for the test station apparatus. In FIG. 9, the test station apparatus 20 carries electrical devices employed for but not limited to measuring and/or feeding an anode current for cathodic protection.

The test station apparatus of the present invention is useful to mount a variable resistor and a shunt while coupled across an insulating flange at the wellheads in underground storage fields. In making an installation, a test lead is attached to each side of an insulating flange and the test station is bolted to the flange so that the leads are connected to separate terminals on the terminal block. A slide wire resistor 72 and a shunt 72A are wired across the two terminals. Based upon test data taken at each well, the resistor is adjusted to control the cathodic protection current on the gathering line to the value required to properly protect the well casing. The cover 26 completely encloses the terminal block, resistor and shunt, thus providing a neat appearance with no dangling wires. This also serves to discourage tampering and vandalism. Moreover, because the test station is an electrical insulator, it also serves to protect corrosion control personnel from electrical shock hazard. These hazards exist when AC potentials are encountered on pipeline structures in shared utility corridors. Unmitigated AC voltages have been measured as high as 45 volts on pipelines paralleling high-voltage electrical transmission lines in these corridors. For utility corridor applications, the test station protects pipe line personnel from coming into direct contact with the metal leads from the underground piping. The test station apparatus of the present invention is also useful to mount and protect lightning arrester devices as used, for example, to protect an insulated flange for underground piping. Resistor 72 has a movable slide wire coupled by a jumper wire 73 to a test terminal 31. Shunt 72A is mounted between two test terminals 31. The resistor 72 is attached by a threaded fastener to end wall 27 of the collar 21. The side wall of collar 21 is provided with rectangularly-shaped openings at diametrically opposite locations for receiving a flat carrier plate 74. The openings in the collar are arranged to extend generally parallel with the top wall 27 at a location which is just above the termination point of threads 22. It is to be understood, if desired, the slots in the collar may intersect the threads 22. When the nut member 25 is passed onto the threads 22, it is fed along the collar into engagement with the projected ends of the carrier plate 74. As the nut member is urged against the carrier plate, frictional engagement therewith retains the test station apparatus 20 at a fixed location on the carrier plate. A support ring 75 is located within the collar between the top wall 27 and the carrier plate 74. If desired, one extended end of the support plate 74 constituting an anchor support arm is bent to provide a vertical attachment end having one or more openings therein for support by aboveground structures.

FIG. 10 illustrates a further modification to an aboveground support for the test station apparatus. The carrier plate 76 shown in FIG. 10 is designed to eliminate the need for additional openings in the side wall 21 of the test station as described above in regard to FIG. 9 for use with the carrier plate 74. As shown in FIG. 10, the carrier plate 76 has an enlarged circular end 77 having a diameter which is greater than the diameter of collar 21. Four arcuate slots 78 extend to support ribs 79 between each slot. Two or more openings to receive test leads are located within the circular area surrounded by slots 78. This area of the carrier plate closes the bottom of the test station to form an insect barrier. The support ribs are arranged and dimensioned to pass into the slotted openings 24 that extend along the lower threaded portion of the collar 21. The arcuate segments of the collar between slots 24 pass through slots 78. The extended height of slots 24 determines the extent to which the carrier plate 76 is passed along collar 21. The support ring 75 described above in regard to FIG. 9 is employed, when desired, to provide added support for the carrier plate 76. After the carrier plate is placed on the collar 21, collet nut 25 is passed into threaded engagement with the threads 22. As this occurs, the collar is compressively secured onto the upper end of a conduit when a conduit is used. Further rotation of the collet nut forcibly engages the nut against the enlarged end 77 of the carrier plate 76. Thus, in the embodiments of FIGS. 9 and 10, the collet nut serves to secure an aboveground carrier plate to the collar and when a conduit is used, the nut 25 brings about the compressive engagement of the collar 21 with the conduit. In FIG. 10, the carrier plate 76 has a projected end that may be bent, if desired, to provide desired mounting onto an aboveground structure.

FIGS. 11 and 12 illustrate a sleeve member 80 employed to form a compressive interfitting connection between collar 21 and conduit 10. Sleeve member 80 is used when, for example, the inside diameter of collar 21 is 1¼" and the outside diameter of conduit 10 is ¾". The sleeve member 80 has a tubular configuration with a U-shaped cross section formed by an end wall 81 and side walls 82 and 83. These walls are divided to form a gap at 84 into which guard plates 85 extend. The guard plates 85 form an insect barrier when the sleeve member 80 is compressed by the collet nut on collar 21. A lug 86 on wall 82 is used to position the sleeve member 80 within collar 21. Spacer legs 87 engage the end wall 27 of the test station to maintain the sleeve member 80 at the inside wall surface of collar 21 at the site of threads 22.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A test station apparatus to monitor electrical currents and potentials in test leads coupled with piping, cables and the like, said apparatus including the combination of:
   a collar including a side wall having threads on the surface thereof and slotted openings at spaced peripheral locations, said collar including an end wall having an annular opening to pass test leads through the collar,
   a nut member having a threaded surface for mating engagement with the threads on said collar,
   a support member engaging said collar for attachment thereto by said nut member,
   pedestals extending vertically from said end wall at opposite sides of the annular opening therein,
   a terminal block supported by said pedestals to traverse across the annular opening in the end wall of said collar such that opposed face surfaces of the terminal block overlie semicircular segments of the annular opening,
   terminals carried by said terminal block for coupling to test leads when extending through either semicircular segment of the annular opening, and
   cover means normally supported by said collar to enclose said terminals.

2. The apparatus according to claim 1 wherein said support member includes:
   a tubular plastic conduit arranged for access to the upper end of the conduit from aboveground, the lower end of the conduit having at least one opening for passing test leads into and along the extended length of the conduit, and
   anchor means to support said conduit.

3. The apparatus according to claim 2 wherein said anchor means includes a rod extending outwardly from the lower end of said conduit.

4. The apparatus according to claim 2 wherein said anchor means includes a plastic tube projecting from diametrically-opposed sides of said conduit.

5. The apparatus according to claim 4 wherein the lower end of said tubular plastic conduit includes aligned openings in the side walls thereof for supporting said plastic tube.

6. The apparatus according to claim 2 wherein said anchor means includes a collar-like plate member with an annular opening to receive the lower end of said tubular plastic conduit, and a sleeve secured to the lower end of said conduit for supporting said collar-like plate member.

7. The apparatus according to claim 2 wherein said nut member comprises a collet nut adapted to pass onto said conduit, said slotted openings at spaced peripheral locations in said collar defining a collet chuck for compressive engagement with said conduit by said collet nut.

8. The apparatus according to claim 1 wherein said support member includes a carrier plate and wherein said collar has aligned openings at diametrically opposite locations to receive said carrier plate for support thereby.

9. The apparatus according to claim 8 wherein the threads on said collar and said aligned openings in said collar are arranged for compressive engagement of said nut member with said carrier plate.

10. The apparatus according to claim 9 wherein said carrier plate has an elongated length sufficient to extend through said collar and project from each of the aligned openings for clamped engagement by said nut member.

11. The apparatus according to claim 8 wherein said carrier plate includes an extended anchor support arm for attachment support.

12. The apparatus according to claim 1 wherein said support member includes a carrier plate having support webs separated by arcuate slots arranged such that the support webs pass into said slotted openings and the arcuate slots receive portions of said collar between the slotted openings.

13. The apparatus according to claim 1 wherein said slotted openings at spaced peripheral locations in said collar extend along said side wall through said threads.

14. The apparatus according to claim 1 wherein said collar, pedestals and terminal block are defined by a unitary plastic member.

15. The apparatus according to claim 1 wherein some of said terminals project from each face surface of said terminal block.

16. The apparatus according to claim 1 wherein said cover means includes a lock bar, and wherein said collar further includes wall means defining a tortuous path of travel for said lock bar between locked and unlocked positions.

17. The apparatus according to claim 1 wherein said collar and said cover means include interfitting support surfaces which include a resilient lock bar.

18. The apparatus according to claim 17 wherein said interfitting support surfaces define a bayonet-type releasable joint.

19. The apparatus according to claim 1 wherein said collar includes a resilient lock bar and wherein said cover means has a recess to receive said resilient lock bar, said cover means having an opening through the wall thereof for access to said resilient lock bar when received in said recess.

20. The apparatus according to claim 2, 7, 13, 14, 17, 18 or 19 further including a sleeve member having a divided side wall to compressively interfit between said support member and said collar.

21. A test station apparatus to monitor electrical currents and potentials in test leads coupled with piping, cables and the like, said apparatus including the combination of:
a collar having a side wall and an end wall with an annular opening therein to pass test leads outwardly through the collar,
a support member engaging said collar,
pedestals extending vertically from said end wall at opposite sides of the annular opening therein,
a terminal block supported by said pedestals to traverse across the annular opening in the end wall of said collar such that opposed face surfaces of the terminal block overlie semicircular segments of the annular opening,
terminals carried by said terminal block for coupling to test leads when extending through either semicircular segment of the annular opening,
a semicircular cover normally enclosing one side of said terminal block through support by said collar, and
cover means normally supported by said collar to enclose said terminals.

22. The apparatus according to claim 21 wherein said support member includes:
a tubular plastic conduit arranged with the upper end of the conduit being accessible from aboveground and the lower end of the conduit having at least one opening for passing test leads into and along the extended length of the conduit, and
anchor means to support said conduit.

23. The apparatus according to claim 22 wherein said anchor means includes a rectangular base with openings to pass test leads into said tubular plastic conduit, said rectangular base being secured to the lower end of the conduit for freestanding support in a subterranean opening.

24. The apparatus according to claim 21 wherein said semicircular cover includes a projection to releasably engage said terminal block for retaining the semicircular cover in an enclosing relation with the ends of said terminals at one side of the terminal block.

25. The apparatus according to claim 21 wherein said terminals include insulative covering with exposed ends at the side of said terminal block opposite said semicircular cover.

26. A test station apparatus to monitor electrical currents and potentials in test leads coupled with piping, cables and the like, said apparatus including the combination of:
a collar having a side wall with an opening for external support, said collar including an end wall having an annular opening to pass test leads outwardly through the collar,
pedestals extending vertically from said end wall at opposite sides of the annular opening therein,
a terminal block supported by said pedestals to traverse across the annular opening in the end wall of said collar such that opposed face surfaces of the terminal block overlie semicircular segments of the annular opening,
terminals carried by said terminal block for coupling to test leads when extending through either semicircular segment of the annular opening,
a carrier plate extending through the opening in said side wall to support said collar and terminal block, and
cover means normally supported by said collar to enclose said terminals.

27. The apparatus according to claim 26 wherein the side wall of said collar has aligned rectangularly-shaped openings at diametrically opposite locations and wherein said carrier plate has ends extending from opposite sides of said collar.

28. The apparatus according to claim 27 further including a nut member threadedly engaged on said collar to engage portions of said carrier plate extending from opposite sides of said collar.

29. The apparatus according to claim 28 further including a support ring within said collar between the said end wall and said carrier plate.

30. The apparatus according to claim 26 wherein said collar and said cover means include interfitting support surfaces which include a resilient lock bar.

31. The apparatus according to claim 30 wherein said interfitting support surfaces define a bayonet-type releasable joint.

32. The apparatus according to claim 26 wherein said collar includes a resilient lock bar and wherein said cover means has a recess to receive said resilient lock bar, said cover means having an opening through the wall thereof for access to said resilient lock bar when received in said recess.

33. A test station apparatus to monitor electrical currents and potentials in test leads coupled with piping, cables and the like, said apparatus including the combination of:
- a collar including a side wall having threads on the surface thereof and slotted openings at spaced peripheral locations, said collar including an end wall having an opening to pass test leads through the collar,
- a nut member having a threaded surface for mating engagement with the threads on said collar,
- a support member engaging said collar for attachment thereto by said nut member,
- means including a terminal block extending from said end wall to traverse across the opening in the end wall of said collar such that opposed face surfaces of the terminal block overlie segments of the opening,
- terminals carried by said terminal block for coupling to test leads when extending through either segment of the opening, and
- cover means to enclose said terminals.

* * * * *